UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLACK AZO DYE.

SPECIFICATION forming part of Letters Patent No. 526,763, dated October 2, 1894.

Application filed May 5, 1894. Serial No. 510,141. (Specimens.)

*To all whom it may concern:*

Be it known that I, ARTHUR WEINBERG, a subject of the Emperor of Germany, and a resident of Frankfort-on-the-Main, Germany, have invented new and useful Improvements in the Production of New Black Azo Dye-Stuffs, of which the following is a specification.

This invention relates to the production of new black cotton dye stuffs, which derive from a new tetrazo compound of the formula

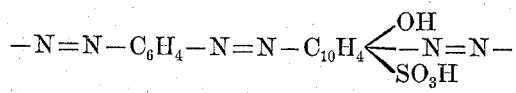

which is combined with aromatic meta diamins such as metaphenylenediamin, metatoluylenediamin. The combination with the metadiamins can be performed in different ways.

In carrying out my invention I proceed for instance as follows:

I. The production of the new tetrazo compound is explained by the following example:

Fifteen kilos acetparaphenylenediamin are dissolved in water and thirty kilos of hydrochloric acid of 20° Baumé and seven kilos of nitrite of soda are added. The thus formed diazo compound is introduced into the solution of twenty-four kilos of gamma amidonaphtholsulfo acid, described in United States Patent No. 454,645, kept alkaline by an excess of carbonate of soda. The resulting azo compound is entirely precipitated by common salt and filtered off. It is then dissolved in an aqueous solution containing ten per cent. of caustic soda. The temperature is raised to about 80° centigrade and kept at this point until it is ascertained by a sample drawn from the solution, that the acetyl group is saponified. Then it is cooled down to 0° centigrade by addition of ice and a sufficient quantity of hydrochloric acid and fourteen kilos of nitrite of soda are added. In a few minutes a clear, red solution is obtained, which now contains the new tetrazo-azo-compound.

I.—The production of the dyestuffs is explained by the following examples:

*First example.*—The solution of the tetrazo-azo-compound produced as above described, is allowed to run into a cold solution of twenty-four kilos metaphenylenediamin, which is kept alkaline by an excess of carbonate of soda. The dye stuff is immediately formed. It separates from the solution. It is filtered off and dried.

*Second example.*—The solution of the tetrazo-azo-compound produced as above described, is made alkaline by addition of carbonate of soda. The red color of the solution turns into blue. Hereafter a solution of twenty-four kilos of gamma amidonaphtholsulfo acid is introduced. The blue color disappears and a black precipitate is formed. By addition of twelve kilos of metaphenylenediamin the formation of the color is performed. The dye stuff separates from the solution. It is filtered off and dried.

*Third example.*—The solution of the tetrazo-azo-compound produced as above described is first combined with twenty-four kilos of gamma-amidonaphtholsulfo acid, as set forth in the second example. Then the solution is acidulated with hydrochloric acid, and seven kilos of nitrite of soda are added. After a short time the solution is allowed to run into the solution of twenty-four kilos of metaphenylenediamin, which is kept alkaline by an excess of carbonate of soda. The formation of the dye stuff will be completed within three to four hours. It separates from the solution. It is filtered off and dried.

The new coloring matter dyes unmordanted cotton in an alkaline bath a deep black of great intensity and fastness. It is soluble in water with a blackish blue color, insoluble in alcohol, ether or benzene, soluble in concentrated sulfuric acid with a bluish black shade, which on addition of a small quantity of water changes into violet-blue. On addition of an excess of water however the dye stuff separates, forming a black precipitate.

Having now described the nature of my invention and in what manner it can be performed, what I claim as new, and desire to secure by Letters Patent, is—

1. The process for producing new black azo-dyes from a new tetrazo-azo-compound, possessing the composition

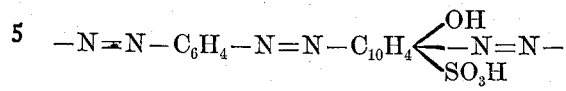

by combining this compound with aromatic metadiamins such as metaphenylenediamin, substantially as herein described.

2. The new coloring matter, which is a black powder, soluble in water with a bluish black color, insoluble in alcohol, ether or benzene, soluble in concentrated sulfuric acid with bluish black color, which changes into blue-violet on addition of a small quantity of water, separating a black precipitate on addition of an excess of water; dyeing unmordanted cotton in an alkaline bath a deep black and having the qualities substantially as specified.

In testimony that I claim the foregoing as my invention I have signed my name, in presence of two witnesses, this 25th day of April, 1894.

ARTHUR WEINBERG.

Witnesses:
 JEAN GRUND,
 FRANK H. MASON.